June 17, 1969
G. W. ZIMMER
3,450,877
PORTABLE GAS FLOW PROPORTIONAL COUNTER FOR
LABORATORY AND FIELD USE
Filed Oct. 22, 1965
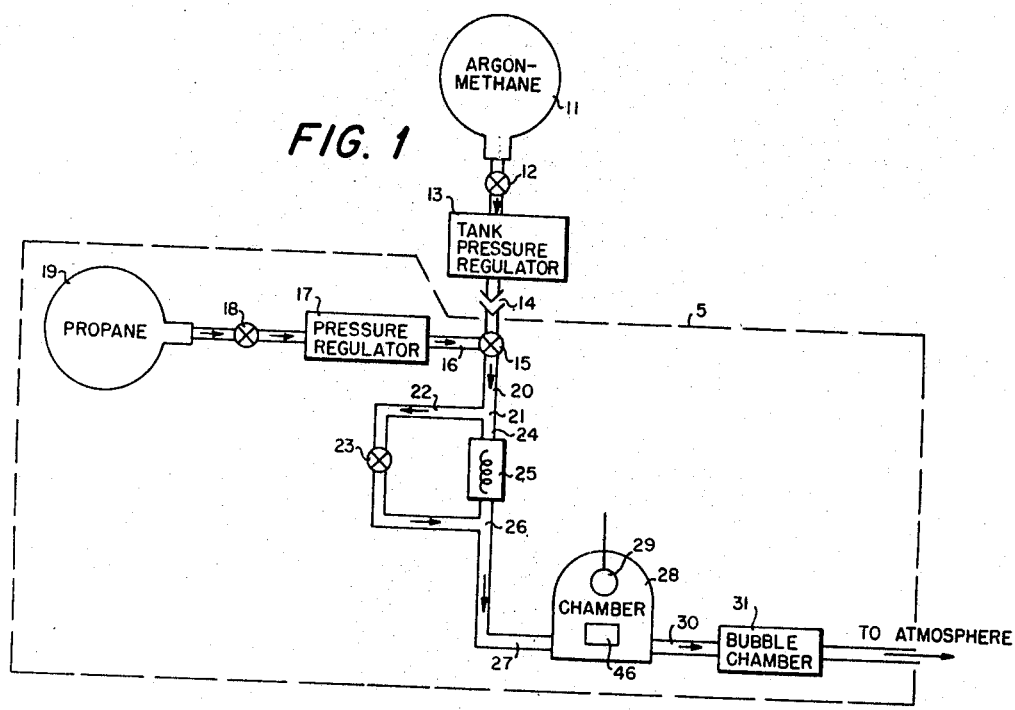
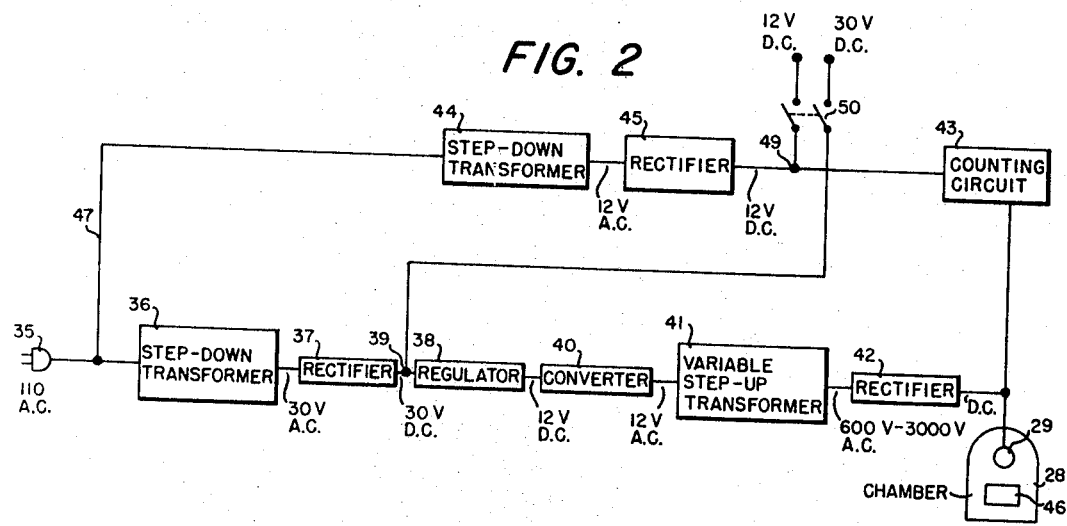
INVENTOR
GLENN W. ZIMMER
BY
ATTORNEY

United States Patent Office 3,450,877
Patented June 17, 1969

3,450,877
PORTABLE GAS FLOW PROPORTIONAL COUNTER FOR LABORATORY AND FIELD USE
Glenn W. Zimmer, 6411 Fairborn Terrace,
Hyattsville, Md. 20784
Filed Oct. 22, 1965, Ser. No. 502,733
Int. Cl. G01n 23/12
U.S. Cl. 250—43.5                    2 Claims

ABSTRACT OF THE DISCLOSURE

The invention concerns a windowless, $2\pi$, portable, gas-flow, proportional counter for laboratory and field use which comprises means for making the instrument portable to line voltage or to a battery back. The instrument may be operated from a self-contained gas supply in its portable condition or from a laboratory supply of gas external to the instrument while located within the laboratory.

---

The invention described herein may be manufactured and used by or for the Government of the United States of America for governmental purposes without the payment of any royalties thereon or therefor.

The present invention relates generally to improvements in windowless, gas-flow, proportional, radiation, counters and the like and more particularly to new and improved windowless, convertible, gas-flow, proportional counters for laboratory and field use, wherein the counter may be operated from a self-contained gas supply in the field, or from a laboratory supply of gas external to the counter while located within the laboratory, and wherein the counter may be made adaptable to line voltages or to a battery.

In the field of windowless, gas-flow, proportional, counters it has been the general practice to employ such counters to perform radiation measurements only in the laboratory. Although such devices have served the purpose they have not proved entirely satisfactory under all conditions of service for the reason that considerable difficulty has been experienced in the time-consuming process of transporting test samples to the laboratory counter from the sites of radioactive spills or from the desired sampling points. This time lag between the obtaining of the sample and the measurement of the sample in the laboratory has resulted in inaccurate reading for the many isotopes having short-lives. All existing radiation counters which are capable of being used in the field are external counters which are inaccurate and which are not convertible from laboratory to field use. Also, the windowless, gas-flow, proportional counters that have been used in the past have not been convertible.

The general purpose of this invention is to provide a windowless, gas-flow, proportional counter which embraces all the advantages of similarly employed counters and possesses none of the aforedescribed disadvantages. To attain this the present invention contemplates a unique arrangement whereby the convertible, windowless counter may be operated from a self-contained gas supply in the field, so as to minimize the time lag between the taking of samples and their measurement, or from a laboratory supply of gas external to the counter while located within the laboratory. The unique arrangement also includes the provision whereby the convertible, windowless counter is adaptable to line voltages or to a battery.

An object of the present invention is the provision of a convertible, gas-flow, proportional counter for laboratory and field measurement of radioactive samples.

Another object is to provide a convertible, windowless, gas-flow, proportional counter which can be hand-carried to the place of use in order to minimize the time lag between the taking of samples and their measurement, which minimization is especially important for samples having isotopes of short half-life.

A further object of the invention is the provision of a convertible, windowless, gas-flow, proportional counter capable of measuring the radioactivity of samples in the field with the accuracy of a laboratory instrument.

Still another object is to provide a convertible, windowless, gas-flow, proportional counter which is capable of being switched for field use, to a low-pressurized gas, such as propane, in a light-weight container within the counter and which is capable of being switched, for laboratory use, to a less expensive high-pressurized gas in a conventional heavy container external to the counter.

With these and other objects in view, as will hereinafter more fully appear, and which will be more particularly pointed out in the appended claims, reference is now made to the following description taken in connection with the accompanying drawings in which:

FIG. 1 shows a diagrammatic representation of the structural components of the gas-flow circuit within the counter of the present invention; and FIG. 2 illustrates a block diagram of the electrical circuits of the counter.

Referring now to the drawings, wherein like reference characters designate like or corresponding parts throughout the several views, there is shown in FIG. 1 a conventional, heavy (in excess of 25 lb.), laboratory gas tank 11, located externally of the counter generally shown as 5, and having a conventional tank valve 12, pressure regulator 13, and a gas-line connector 14. The connector 14 is, in turn, connected to switching valve 15 during operation of the counter in the laboratory, and is disconnected from switching valve 15 and the counter during field operation of the counter.

The switching valve 15 has an additional permanent gas-line inlet 16 connected to pressure regulator 17, which in turn, is connected to a light weight, self-contained (within counter) gas supply 19 through valve 18.

Switching valve 15 exits to outlet gas line 20 which forms a T-junction at point 21 so that the branch gas line 22 passes through metering valve 23 and so that the branch gas line 24 passes through purging valve 25, which may be an electrically operated valve such as a coaxial solenoid valve or which may be a manually operated valve.

The branch gas lines 22 and 24 reunite at T-junction 26 and exit into gas lines 27 which enters test chamber 28 containing electrode 29 and test sample 46, which are discussed in connection with FIG. 2. The chamber 28 can be any one of several geometries such as a hemisphere (two pi steradians), a sphere (four pi steradians) or a cylinder. Gas line 30 then vents the chamber 28 into a conventional bubble chamber 31, which is well known in the art and which indicates the gas flow, and then into the atmosphere.

Referring now to the counter's electrical circuit shown in FIG. 2, a conventional wall plug 35, capable of drawing 110 volts A.C., is connected to energize the primary winding of step down transformer 36. The secondary winding of transformer 36 is connected to rectifier 37 which is, in turn, connected to voltage regulator 38. Located between the rectifier 37 and voltage regulator 38 is battery connection 39, which may be connected to double-pole, single-throw switch 50, or to a similar device, so as to supply terminal 39 with a D.C. potential preferably approximately 30 volts.

The output of voltage regulator 38 is applied to the input of converter 40 which energizes the primary of variable step-up transformer 41. The secondary of transformer 41 is connected to the input of rectifier 42, the rectified output of which provides the electrode 29, within chamber 28, with a constant D.C. potential.

The electrode 29 is connected to counting circuit 43 which is supplied with direct current from rectifier 45 derived from A.C. applied through tap-off line 47 from outlet plug 35. This tap-off line 47 is connected to the primary of step down transformer 44, the secondary of which is connected to rectifier 45, which is connected to counting circuit 43, and located between rectifier 45 and counting circuit 43 is battery connector 49.

In the field operation of the convertible windowless counter and of the gas-flow system shown in FIG. 1 the self-contained gas supply 19, which is mounted within the counter and which is preferably propane gas, supplies gas to the chamber 28 in which is placed a test sample 46 of radioactive material to be counted. The gas passes through valve 18, pressure regulator 17 and gas-line inlet 16 into switching valve 15, which passes the gas into outlet gas line 20 and to T-junction 21. During field operation of the counter the connector 14 is disconnected and the switching valve 15 allows only the entry of gas from gas-line inlet 16 and the exit of gas to outlet gas line 20.

In order to flush the air and impurities from chamber 28 prior to the measurement of the sample's radioactivity, the purging valve 25 is opened for a period of time and the gas then flows from T-junction 21 through the purging valve and also through the metering valve 23 into the chamber 28 and finally out of the chamber 28 through bubble chamber 31 and into the atmosphere. After a predetermined time the purging valve 25 is closed and the gas is then fed to the chamber 28 solely through metering valve 23.

When the counter is used in the laboratory, valve 18 is maintained in the closed position and the laboratory gas tank 11 is connected to the gas system by connector 14, and any known and relatively inexpensive counting gas is used, such as an argon-methane mixture because the gas used in the self-contained gas supply 19, e.g. propane, is very expensive and continued use of this expensive gas is uneconomical. The gas from container 11 passes through tank valve 12, pressure regulator 13, connector 14 and into switching valve 15 which, when adjusted for laboratory use of the counter, blocks the inlet from line 16 and passes the gas from container 11 into outlet gas line 20 without admitting any of the propane gas from the self-contained gas supply 19. From this point, the operation of the gas system is identical with the previously described operation of the system while in a field-use condition.

In the laboratory operation of the convertible, windowless counter and of the electrical circuits of the counter shown in FIG. 2 the wall plug 35 is placed within a conventional 110 volt wall receptacle (not shown). The A.C. voltage is reduced by step-down transformer 36, rectified to D.C. by the rectifier 37, regulated by voltage regulator 38, changed from D.C. to A.C. by converter 40, increased by variable step-up transformer 41, and rectified by rectifier 42 to provide the desired D.C. voltage to electrode 29. The purpose of the variable step-up transformer 41 is to provide the electrode 29 with the different voltages required for operation of the counter within the voltage plateaus required for the measurement of alpha and beta particles, which plateaus are centered at approximately 2100 volts and 2800 volts, respectively, for propane gas and 1100 volts and 1800 volts, respectively, for an argon-methane gas mixture.

A counting circuit 43 is provided which is connected to electrode 29. As particles are emitted by the test sample 46 negative gas ions are produced within the chamber 28 and these ions are collected by the electrode 29, which is at a high positive D.C. potential. The voltage pulses resulting from the collection of gas ions at the electrode 29 are then counted by the counting circuit 43 which is powered by the voltage supplied from tap-off line 47. This tapped-off voltage is reduced by step-down transformer 44, rectified by rectifier 45 and is then supplied to the counting circuit 43.

When the convertible windowless counter is used in the field the wall plug 35 may be used with any conventional 110 volt A.C. outlet which is available. If no such outlets are available a battery (not shown) may be used to supply the necessary power. In order to facilitate the use of batteries, battery connections 39 and 49 are provided within the circuit of the counter, and are connected to double-pole, single-throw switch 50 which supplies D.C. potentials to connections 39 and 49, preferably at 30 volts and 12 volts, respectively.

The resolving time of the counting circuit is approximately 2 microseconds thus eliminating the necessity of making coincidence corrections for reasonable count rates. The coincidence correction is about 1% at 300,000 counts/minute, and about 3% at 1,000,000 counts/minute. The convertible counter has a weight of about 20 pounds including the light-weight, self-contained gas supply. When batteries are used the weight is approximately 25 pounds.

The invention provides a unique convertible, windowless counter which is capable of being switched to the use of a low-pressurized gas in a light weight container that is self-contained within the counter for field use, and which is capable of being switched to the use of a less-expensive high-pressurized gas in a large conventional gas tank external to the counter for laboratory use and which may be selectively operated from either an A.C. or D.C. power supply.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A convertible, windowless, gas-flow, proportional counter adaptable for either field or laboratory use comprising:

a self-contained gas supply within said counter, means permitting connection to the counter of an external gas supply, a valve having one gas line inlet from said self-contained gas supply, one gas line inlet from said external gas supply, and one outlet gas line, a first gas-line T-junction integral with said outlet gas line, wherein said outlet gas line forms the inlet of said first T-junction, a first branch gas line integral with and forming an outlet of said first T-junction, a gas-flow metering valve integral with said first branch gas line, a second branch gas line integral with and forming an outlet of said first T-junction, a purging valve integral with said second branch line, said first and second branch gas lines being integral with and forming the inlets of a second gas line T-junction, and a test chamber containing a test sample of which the radioactivity is desired to be measured, said chamber having an inlet gas line which is connected as the outlet of said second T-junction, whereby gas is vented from said second T-junction into said chamber.

2. A convertible counter as claimed in claim 1 including:
   operating potential selection means for enabling the counter to be selectively operated from either an A.C. or a D.C. power supply.

References Cited

UNITED STATES PATENTS

| | | |
|---|---|---|
| 2,998,522 | 8/1961 | Martin et al. _____ 250—108 X |
| 3,033,986 | 5/1962 | Fowler et al. |
| 3,155,829 | 11/1964 | Frank. |

RALPH G. NILSON, *Primary Examiner.*

SAUL ELBAUM, *Assistant Examiner.*

U.S. Cl. X.R.

73—23.1; 222—6; 250—83.6